(12) United States Patent
Yang et al.

(10) Patent No.: US 10,070,148 B2
(45) Date of Patent: Sep. 4, 2018

(54) METHOD AND APPARATUS FOR BIT RATE CONFIGURATION FOR MULTI-VIEW VIDEO CODING

(75) Inventors: Hua Yang, Plainsboro, NJ (US); Richard Edwin Goedeken, Santa Clarita, CA (US); Joan Llach, Cesson-Sevigne (FR)

(73) Assignee: THOMSON LICENSING DTV, Issy les Moulineaux (FR)

( * ) Notice: Subject to any disclaimer, the term of this patent is extended or adjusted under 35 U.S.C. 154(b) by 851 days.

(21) Appl. No.: 12/932,062

(22) Filed: Feb. 16, 2011

(65) Prior Publication Data

US 2011/0211643 A1    Sep. 1, 2011

Related U.S. Application Data

(60) Provisional application No. 61/306,792, filed on Feb. 22, 2010.

(51) Int. Cl.
*H04N 7/12* (2006.01)
*H04N 11/02* (2006.01)
*H04N 11/04* (2006.01)
*H04N 19/60* (2014.01)

(52) U.S. Cl.
CPC .................................. *H04N 19/60* (2014.11)

(58) Field of Classification Search
CPC ...... H04N 7/24; H04N 7/26; H04N 19/00321; H04N 19/00181; H04N 19/0009
USPC ....................................... 375/240.26, 240.02
See application file for complete search history.

(56) References Cited

U.S. PATENT DOCUMENTS 6,895,054 B2 *  5/2005  Li ............................ 375/240.13
2013/0028316 A1 *  1/2013  Leontaris et al. ....... 375/240.03

OTHER PUBLICATIONS

Liu et al., "A Real Time Interactive Dynamic Light Field Transmission System", 2006 IEEE International Conference on Multimedia and Expo, Jul. 9-12, 2006, pp. 2173-2176.
Naito et al., "Advanced Rate Control Technologies for 3D-HDTV Digital Coding Based on MPEG-2 Multi-View Profile", Image Processing, 1999, ICIP 99, vol. 1, 1999, pp. 281-285.
Ramchandran et al., "Bit Allocation for Dependent Quantization with Applications to Multiresolution and MPEG Video Coders", IEEE Transactions on Image Processing, vol. 3, No. 5, Sep. 1994. Article on "Statistical Multiplexing".
Karlsson et al., "Multiview Plus Depth Scalable Coding in the Depth Domain", 3DTV Conference: The True Vision—Capture, Transmission and Display of 3D Video, 2009, May 2009, pp. 1-4, 4-6.

(Continued)

*Primary Examiner* — Hee-Yong Kim
(74) *Attorney, Agent, or Firm* — Brian J. Dorini; Patricia A. Verlangieri

(57) ABSTRACT

A method and apparatus are disclosed and described for providing bit rate configuration for multi-view video coding. In the video encoder, the method includes encoding image data for at least one picture for at least two joint views of multi-view video content, the at least two joint views including a base view and at least one dependent view. The bit rate configuration for encoding the image data is determined to include an average bit rate and a maximum bit rate for the base view and the average bit rate and the maximum bit rate for the at least two joint views (235, 215, 220).

18 Claims, 2 Drawing Sheets

(56) References Cited

OTHER PUBLICATIONS

Ekmekcioglu et al., "Bit-Rate Adaptive Downsampling for the Coding of Multi-view Video with Depth Information", 3DTV Conference: The True Vision—Capture, Transmission and Display of 3D Video, May 23-28, 2008, pp. 137-140.

ITU-T H.264, "Advanced Video Coding for Generic Audiovisual Services", International Telecommunication Union, Mar. 2009, 670 pages.

* cited by examiner

METHOD AND APPARATUS FOR BIT RATE CONFIGURATION FOR MULTI-VIEW VIDEO CODING

CROSS-REFERENCE TO RELATED APPLICATIONS

This application claims the benefit of U.S. Provisional Application Ser. No. 61/306,792, filed Feb. 22, 2010, which is incorporated by reference herein in its entirety.

TECHNICAL FIELD

The present principles relate generally to video encoding and, more particularly, to a method and apparatus for bit rate configuration for multi-view video coding.

BACKGROUND

In the design of a video encoder, there is usually the issue of how to specify the coding bit rate objective. This is typically a trivial issue in conventional single view video coding scenarios. For example, usually one just needs to specify the average and maximum target coding bit rates of the coded video, denoted with $R_{avg}$ and $R_{max}$, respectively. However, in commercial video coding applications involving multi-view coding (MVC), bit rate configuration is a design task that demands much more scrutiny.

Multi-view video coding (MVC) is the compression framework for the encoding of multi-view sequences. A Multi-view Video Coding (MVC) sequence is a set of two or more video sequences that capture the same scene from a different view point.

In multi-view video coding, there is one video view that is referred to as the base view. The base view represents conventional two-dimensional (2D) video coding scenarios, and serves conventional 2D video applications such as, for example, 2D movies and televisions, and so forth. In addition, there are one or more views referred to as dependent views. Dependent views are shot for the same scene from various different angles, to support multi-view video applications such as, for example, three-dimensional (3D) movies and televisions and so forth. In the MVC extension of the International Organization for Standardization/International Electrotechnical Commission (ISO/IEC) Moving Picture Experts Group-4 (MPEG-4) Part 10 Advanced Video Coding (AVC) Standard/International Telecommunication Union, Telecommunication Sector (ITU-T) H.264 Recommendation (hereinafter the "MPEG-4 AVC Standard"), the base view is coded in the same way as the 2D MPEG-4 AVC Standard coding case. However, dependent view coding can benefit from the coded based view video frames via a new macroblock (MB) coding mode called inter-view prediction, and hence, yield much better compression efficiency than that of the base view coding.

Therefore, in these new MVC scenarios, there exist bit rate configuration issues. For example, in practice, variable bit rate multi-view video coding implies applications such as 3D movie compression onto Blue-ray Discs (BD), and so forth. In this scenario, first one needs to decide whether to respectively specify $R_{avg}$ and $R_{max}$ for each individual view or to specify $R_{avg}$ and $R_{max}$ for the joint views (i.e., the former with each view considered separately or the latter with all the views considered together). Enforcing bit rate requirements for each single view can guarantee the coding quality of each view in advance. However, such enforcement precludes the encoder from exploring the globally optimal bit allocation among all the views, which could have provided a better overall coding performance had the same been explored and used. On the other hand, enforcing only the bit rate requirements for the joint view only allows for global optimal rate control across views. However, the result cannot guarantee that some particular views meet some particular quality constraint. Especially in practice, an explicit target bit rate requirement of the base view is highly desirable to guarantee the quality of the base view coding in order to not compromise the quality of existing conventional 2D video services which only rely upon the base view 2D view.

As previously stated, in conventional single view (i.e., 2D) video coding scenarios, bit rate configuration is mostly a trivial issue in the encoder design. Typically, one just needs to specify the $R_{avg}$ and $R_{max}$ of the coded video. In constant bit rate (CBR) coding situations, such as video broadcasting or streaming over networks, $R_{avg}$ is often directly determined by the limited transmission channel bandwidth. In variable bit rate cases, such as video storage applications, $R_{avg}$ can be easily derived from the total storage space and the total play-out time of the input video. $R_{max}$ is a constraint mainly for the purpose of multiplexing the coded video bitstream with other related data streams such as, for example, coded audio or other coded video streams, for the overall system output. In that case, the coded video needs to be properly constrained with $R_{max}$ such that all the data streams can be successfully multiplexed together as one single output stream of the whole application system. Otherwise, $R_{max}$ is not a desirable coding constraint, as a limited $R_{max}$ in turn limits the capability of the encoder to achieve consistent coding quality across all the video frames which may lead to a compromised overall subjective quality experience.

However, with the presence of multiple views of video, the new multi-view video coding scenarios make bit rate configuration a more difficult and important problem for MVC encoder design, for which there is no one widely accepted solution. To account for multiple views, one choice is to specify $R_{avg}$ and $R_{max}$ for each individual view respectively. In this way, the encoder will strictly adhere to these requirements and thus render coded video at guaranteed levels of quality as prescribed at each view. The problem with this scheme is that these requirements are determined before encoding. Thus, these requirements are likely not the global optimal configuration, since such global optimal configuration can only be found out somewhere within the encoding process. For example, after some sort of necessary analysis of the whole video sequence, there is enough information for the encoder to make estimates of coding complexities of each view. Then, the encoder may carry out some well designed rate control algorithm to figure out the global optimal bit allocations for all the views, which meet with the joint view $R_{avg}$ and $R_{max}$ requirements while at the same time maximize the perceptual quality of the coded multi-view video. Therefore, for the sake of global optimality, the other possible choice of multi-view video coding bit rate configuration is to only specify the joint view $R_{avg}$ and $R_{max}$. However, this scheme loses all the single view quality guarantees. Especially for the base view, a quality guarantee via $R_{avg}$ and $R_{max}$ is highly desirable such that the new multi-view video coding result with a global optimal bit allocation across all the views will not yield much compromised coding quality of the base view. In practice, this is important, because all the existing conventional 2D video consumers will only see the base view video. As a service provider, satisfactory performance of services has to be provided for existing customers as well as new customers.

SUMMARY

These and other drawbacks and disadvantages of the prior art are addressed by the present principles, which are directed to a method and apparatus for bit rate configuration for multi-view video coding.

According to an aspect of the present principles, there is provided an apparatus. The apparatus includes an encoder for encoding image data for at least one picture for at least two joint views of multi-view video content. The at least two joint views include a base view and at least one dependent view. A bit rate configuration for encoding the image data is determined to include an average bit rate and a maximum bit rate for the base view and the average bit rate and the maximum bit rate for the at least two joint views.

According to another aspect of the present principles, there is provided a method in a video encoder. The method includes encoding image data for at least one picture for at least two joint views of multi-view video content. The at least two joint views include a base view and at least one dependent view, wherein a bit rate configuration for encoding the image data is determined to include an average bit rate and a maximum bit rate for the base view and the average bit rate and the maximum bit rate for the at least two joint views.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
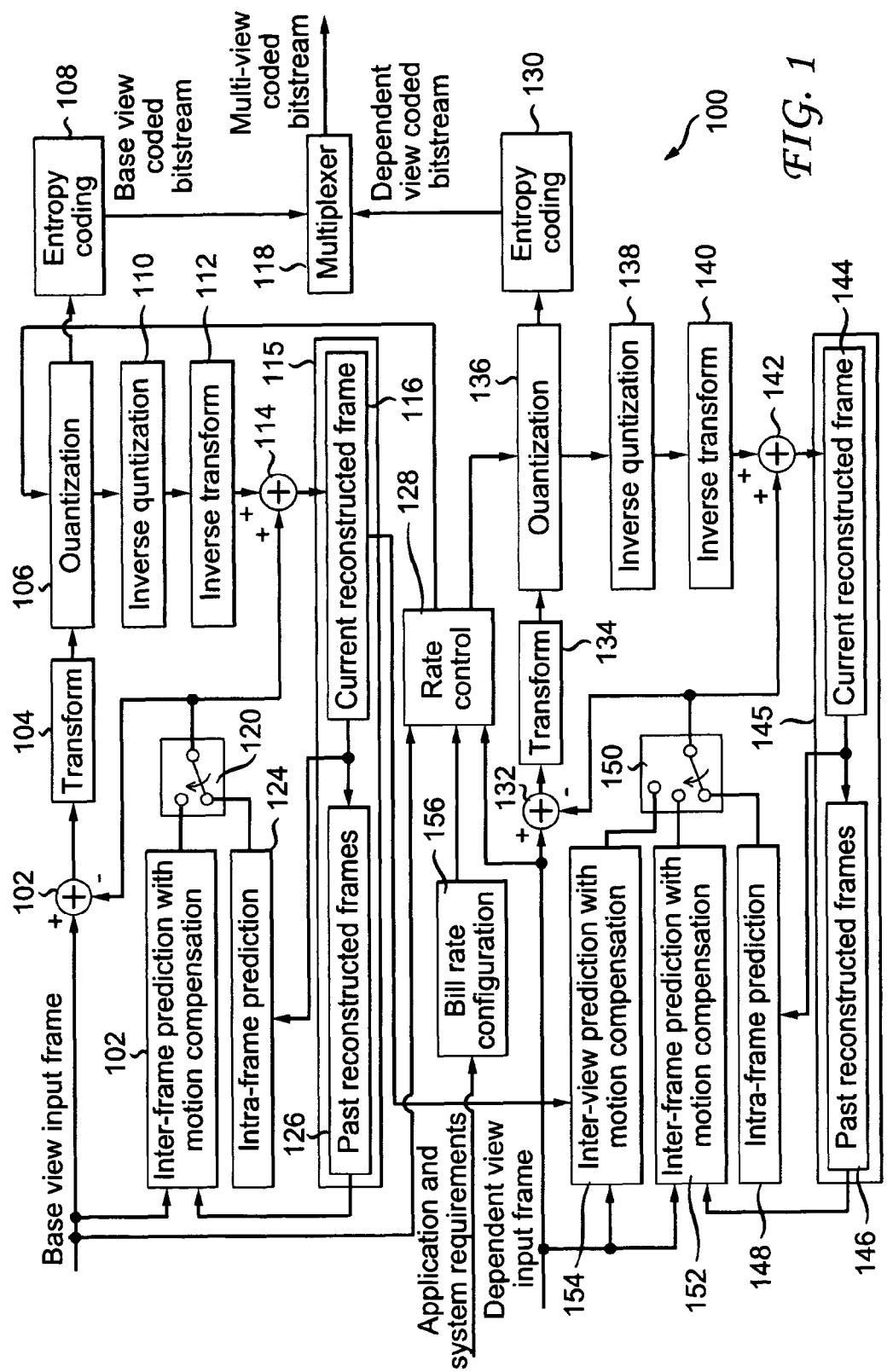
FIG. 1 is a block diagram showing an exemplary multi-view video encoder, in accordance with an embodiment of the present principles.

The present principles are directed to a method and apparatus for bit rate configuration for multi-view video coding.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items as listed.

Also, as used herein, the words "picture" and "image" are used interchangeably and refer to a still image or a picture from a video sequence. As is known, a picture may be a frame or a field.

Additionally, as used herein, the phrase "bit rate configuration" refers to a particular set of parameters that are used to control the bit rate at which is coded image data for one or more pictures corresponding to multi-view video content. As is known, multi-view video content can be coded to include a base view and at least one dependent view, with the base view and the at least one dependent view being collectively referred to as "joint views". That is, as used herein, "joint views" refer to the base view and at least one dependent view corresponding thereto. In at least one embodiment, a bit rate configuration determined in accordance with the present principles can include an average bit rate and a maximum bit rate for the base view and the average bit rate and the maximum bit rate for the at least two joint views.

Moreover, as used herein, the phrase "encoder specific multiplication factor" refers to the minimum ratio between the maximum and average bit rates that a specific video encoder can actually achieve. Since, in practice, to achieve the best coding performance of the whole video sequence, different amounts of bits are allocated to different frames, usually according to their different frame types of I/P/B and different perceptual masking effects. Depending on specific video encoder algorithms and their implementations, different encoders may have different minimum achievable values of maximum bit rate, given a same certain average bit rate. The defined encoder specific multiplication factor herein is therefore to quantify such an effect via calculating the ratio between the minimum achievable maximum bit rate and the average bit rate. As is known, an I frame refers to an intra-coded frame, a P frame refers to a predictively coded frame, and a B frame refers to a bi-predictively coded frame.

Turning to FIG. 1, an exemplary multi-view video encoder is indicated generally by the reference numeral 100. The video encoder 100 includes a combiner 102 having an output connected in signal communication with an input of a transformer 104. An output of the transformer 104 is connected in signal communication with a first input of a quantizer 106. A first output of the quantizer 106 is connected in signal communication with an input of an inverse quantizer 110. An output of the inverse quantizer 112 is connected in signal communication with an input of an inverse transformer 112. An output of the inverse transformer 112 is connected in signal communication with a first non-inverting input of a combiner 114. An output of the combiner 114 is connected in signal communication with an input of a buffer 115. The buffer 115 stores a current reconstructed frame 116 output from the combiner 114 as well as past reconstructed frames 126 previously output from the combiner 114. A first output of the buffer 115 is connected in signal communication with an input of an intra-frame predictor 124. A second output of the buffer 115 is connected in signal communication with a first input of an inter-frame predictor with motion compensation 122. An output of the intra-frame predictor 126 is connected in signal communication with a first input of a switch 120. An output of the inter-frame predictor with motion compensation 122 is connected in signal communication with a second input of the switch 120. An output of the switch 120 is connected in signal communication with an inverting input of the combiner 102 and a second non-inverting input of the combiner 114. A second output of the quantizer 106 is connected in signal communication with an input of an entropy coder 108. An output of the entropy coder 108 is connected in signal communication with a first input of a multiplexer 118.

An output of a bit rate configurer 156 is connected in signal communication with a first input of a rate controller 128. A first output of the bit rate configure 156 is connected in signal communication with a second input of the quantizer 106. A second output of the rate controller 128 is connected in signal communication with a first input of a quantizer 136. A first output of the quantizer 136 is connected in signal communication with an input of an entropy coder 130. An output of the entropy coder 130 is connected in signal communication with a second input of the multiplexer 118. A second output of the quantizer 136 is connected in signal communication with an input of an inverse quantizer 138. An output of the inverse quantizer 138 is connected in signal communication with an input of an inverse transformer 140. An output of the inverse transformer 140 is connected in signal communication with a first non-inverting input of a combiner 142. An output of the combiner 142 is connected in signal communication with an input of a buffer 145. A first output of the buffer 145 is connected in signal communication with an input of an intra-frame predictor 148. An output of the intra-frame predictor 148 is connected in signal communication with a first input of a switch 150. A second output of the buffer 145 is connected in signal communication with a first input of an inter-frame predictor with motion compensation 152. An output of the inter-frame predictor with motion compensation 152 is connected in signal communication with a second input of the switch 150. A third output of the buffer 115 is connected in signal communication with a first input of an inter-view predictor with motion compensation 154. An output of the inter-view predictor with motion compensation 154 is connected in signal communication with a third input of the switch 150. An output of the switch 150 is connected in signal communication with an inverting input of a combiner 132 and a second non-inverting input of the combiner 142. An output of the combiner 132 is connected in signal communication with an input of a transformer 134. An output of the transformer 134 is connected in signal communication with an input of a quantizer 136.

A non-inverting input of the combiner 102, a second input of the inter-frame predictor with motion compensation 122, and a second input of the rate controller 128 are available as inputs of the MVC video encoder 100, for receiving a base view input frame. An input of the bit rate configure is available as an input of the MVC video encoder 100, for receiving application and system requirements. A third input of the rate controller 128, a non-inverting input of the combiner 132, a second input of the inter-view predictor with motion compensation 154, and a second input of the inter-view predictor with motion compensation 152 are available as inputs of the MVC encoder 100, for receiving a dependent view input frame. An output of the multiplexer 118 is available as an output of the MVC encoder 100, for outputting a multi-view coded bitstream.

As noted above, the present principles are directed to a method and apparatus for bit rate configuration for multi-view video coding. In a multi-view video coding encoder, configuring the coding bit rate requirements represents the starting point of an encoding task, and is an important problem in the encoder design. A good bit rate configuration scheme should properly account for all the necessary system or application requirements regarding the use of the coded video bit stream, while adding no unnecessary constraints for the encoder rate control algorithm design.

Thus, in accordance with the present principles, we have developed a new configuration scheme for determining bit rate requirements. In an exemplary embodiment, we do so using four parameters, namely the average and maximum bit rates for the base view (i.e., the base view by itself) and the joint views (i.e., with all the views included, namely the base view and all of the dependent views) coding. We also have developed and herein disclose embodiments for how these four parameters are implemented, considering both system or application requirements and the specific encoder algorithm implementation. This scheme has been created and developed by us and successfully tested in our TIGER 3D video encoder, resulting in outstanding performance for variable bit rate multi-view video coding.

Therefore, herein, we disclose a multi-view video coding bit rate configuration scheme which includes four parameters that specify the $R_{avg}$ and $R_{max}$ of the base view and the joint views respectively. We also address the issue of how these four bit rate parameters are derived from a practical system and application considerations. We also show that these four parameters are enough to derive the missing bit rate constraints for all the dependent views, which could better be taken by the encoder as tentative guidance on its rate control, rather than some necessary requirements to be strictly fulfilled. This approach has been tested on our commercial variable bit rate 3D video encoder (TIGER 3D) for BLUE RAY 3D movie compression, and has achieved outstanding overall video coding performance.

In accordance with the present principles, we have developed a multi-view video coding bit rate configuration scheme which allows the encoder to explore global optimal bit allocations across views, and also render the basic coding quality guarantee of the base view. As such, an MVC encoder can effectively carry out encoding to achieve a good overall coding performance, without the impact of unduly constraining bit rate limitations on coding each dependent view.

In this scheme, the multi-view video coding bit rate configuration includes four parameters, namely $R_{avg}$ and $R_{max}$ of the base view and $R_{avg}$ and $R_{max}$ of the joint view, denoted by $R_{avg,base}$, $R_{max,base}$, $R_{avg,joint}$ and $R_{max,joint}$ respectively.

Figure 2:
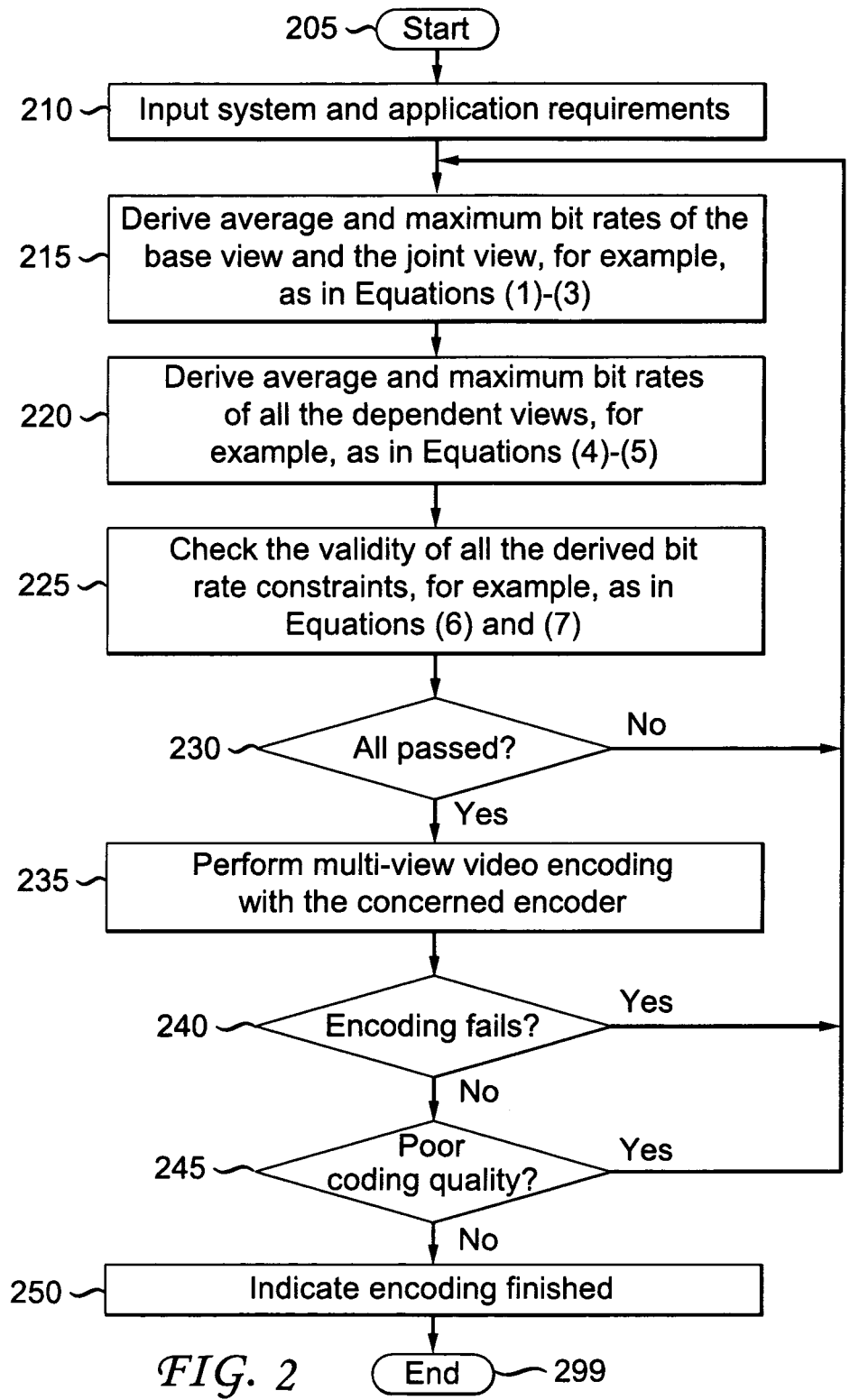
FIG. 2 is a flow diagram showing an exemplary method for determining a bit rate configuration for multi-view video coding, in accordance with an embodiment of the present principles.

Turning to FIG. 2, an exemplary method for determining a bit rate configuration for multi-view video coding is indicated generally by the reference numeral 200. The method 20o includes a start block 205 that passes control to a function block 210. The function block 210 inputs system and application requirements, and passes control to a function block 215. The function block 215 derives the average and maximum bit rates of the base view and the joint view (e.g., using Equations (1)-(3)), and passes control to a function block 220. The function block 220 derives the average and maximum bit rates of all the dependent view (e.g., using Equations (4)-(5)), and passes control to a function block 225. The function block 225 checks the validity of all derived bit rate constraints (e.g., using Equations (6)-(7)), and passes control to a decision block 230. The decision block 230 determines whether or not all derived bit rate constraints have passed the validity check (performed by the function block 225). If so, then control is passed to a function block 235. Otherwise, control is returned to the function block 215. The function block 235 performs multi-view video encoding with the concerned encoder, and passes control to a decision block 240. The decision block 240 determines whether or not the multi-view video encoding performed with the concerned encoder (by the function block 235) has failed. If so, then control is returned to the function block 215. Otherwise, control is passed to a decision block 245. The decision block 245 determines whether or not the coding quality is poor. If so, then control is returned to the function block 215. Otherwise, control is passed to a function block 250. The function block 250 provides an indication that the encoding is finished, and passes control to an end block 299.

Derivation of $R_{avg,base}$, $R_{max,base}$, $R_{avg,joint}$ and $R_{max,joint}$ Outside an Encoder In our concerned MVC coding scenarios, $R_{avg,joint}$ and $R_{max,joint}$ can be derived in practice as follows. Herein, $R_{max,system}$ and $R_{max,stream,i}$ denote the maximum bit rates of the overall system output and the other $i^{th}$ data stream in the system, respectively.

For variable bit rate multi-view video coding, the following applies:

$$R_{avg,joint} = \frac{TotalStorageSpaceInBits}{TotalVideoLengthInSeconds} \quad (1)$$

For constant bit rate multi-view video coding, the following applies:

$$R_{avg,joint} = TotalChannelBandwithForVideo \quad (2)$$

$$R_{max,joint} = R_{max,system} - \sum_i R_{max,stream,i} \quad (3)$$

Note that for simplicity, Equation (3) only gives the most conservative way of conducting multiple stream multiplexing, as it deals with the maximum bit rates of all the involved data streams. In practice, most of the time, all the streams will not hit their $R_{max}$ at the same time. Therefore, a smaller $R_{stream,i}$ than $R_{max,stream,i}$ may be counted for stream i, so that the multiple data streams are multiplexed in a statistical way to meet $R_{max,system}$. In that case, a larger $R_{max,joint}$ will be yielded than that in Equation (3). This multiplex approach is called statistical multiplex, and is more often used in practice.

As for $R_{avg,base}$ and $R_{max,base}$, in order to ensure the base view coding quality from the new MVC encoding is no worse than that from the old conventional 2D video encoding so as to best serve the existing 2D video based customers, these two parameters can be set the same as those for the conventional 2D video coding.

Derivation of Dependent View $R_{avg}$ and $R_{max}$ Inside an Encoder

Given $R_{avg,base}$, $R_{max,base}$, $R_{avg,joint}$ and $R_{max,joint}$, one may also derive $R_{avg}$ and $R_{max}$ for each dependent view as follows.

$$R_{avg,dpd,i} = \frac{(R_{avg,joint} - R_{avg,base})}{TotalViews - 1} \quad (4)$$

$$R_{max,dpd,i} = R_{avg,dpd,i} + \frac{\lfloor (R_{max,joint} - R_{avg,joint}) - (R_{max,base} - R_{avg,base}) \rfloor}{TotalViews - 1} \quad (5)$$

where $R_{avg,dpd,i}$ and $R_{max,dpd,i}$ respectively denote the average and maximum bit rate constraints for the $i^{th}$ dependent view, and TotalViews denotes the total number of all the views (i.e., the base view and all of the dependent views). Note that for the sake of simplicity, we assume herein that all the dependent views are of the same importance, i.e., there is no preference on one particular dependent view coding performance over the others. In practice, it is possible that some dependent views may be more important than the others for some reason, e.g., user preference, and so forth. In that case, a proper set of weighting factors can be derived for each dependent view, which can be simply added into our bit rate configuration and then easily integrated accordingly into the calculation of $R_{avg,dpd,i}$ and $R_{max,dpd,i}$ in Equation (4) and Equation (5).

Note that we show the above derivation on $R_{avg,dpd,i}$ and $R_{max,dpd,i}$ simply to demonstrate it as an internally available capability of the MVC encoder. How to interpret or use these dependent view constraints are never explicitly prescribed for the encoder, which means that it is not necessary for the encoder to strictly enforce and fulfill these constraints in its rate control, and the encoder is free to take advantage of the information to explore the best coding performance possible. In contrast, parameters in the bit rate configuration represent necessary requirements for an encoder. That is why they are identified in our bit rate configuration, which should be implemented as part of the user interface of an encoder.

Validity Check for all the Bit Rate Constraints

In practice, we also need to perform validity checks for all the above derived bit rate constraints.

First, we need to ensure the following:

$$(R_{max,joint} - R_{avg,joint}) \geq (R_{max,base} - R_{avg,base}) \quad (6)$$

This is because the base and joint view bit rate constraints are independently derived from different system and performance requirements. Hence, they may conflict with each other, and render invalid dependent view coding constraints. Specifically, if Equation (6) is violated, then the dependent view maximum bit rate will be less than its average bit rate, which does not make sense.

Second, we need to ensure the following:

$$R_{max,view,i} \geq \alpha_i \cdot R_{avg,view,i} \quad (7)$$

Herein, "view i" could be each one single view of the base view, the dependent view or the joint view. $\alpha_i$ is a parameter that specifies the minimum gap or difference between the maximum and average bit rates for view i.

Ideally, for better coding quality, we prefer a higher maximum bit rate. However, in practice, to properly multiplex the coded video stream with other data streams in the system, one has to limit the maximum bit rate. This leads to our initially derived maximum bit rates in the bit rate configuration, which are represented by $R_{max,view,i}$ in Equation (7).

On the other hand, an encoder itself may implicitly demand an inherent minimum limit for the maximum bit rate. This is because in practice a video sequence is usually coded into group-of-pictures (GOPs), each of which starts with an I-frame and then follows with P-/B-frames. Without inter-frame motion compensation, I-frames generally consume much more coding bits than P/B-frames to achieve the same coding quality. Moreover, as a widely recognized good practice, higher coding quality is preferred for the $1^{st}$ I-frame in a GOP than for the rest P/B-frames, which always proves to render better overall coding efficiency of the whole GOP. As such, in practice, peak coding bit rates are mostly incurred at I-frames with much larger amount of bits than the remaining P/B-frames. Due to this commonly adopted encoding practice, given a certain average bit rate, the resultant maximum bit rate of the coded bitstream by the encoder usually cannot go infinitely close to the average bit rate, and there is always a minimum gap between them. Such an inherent property of the encoder is captured by $\alpha_i$ in Equation (7), which is an important characteristic number of the encoder.

In practice, besides the I-frame higher quality preference, there may be other quality preference practices in an encoder. Most notably, because of the spatial and temporal masking effects of the human visual system, we prefer a lower coding quality for high motion or high spatial activity frames than that for low motion or low spatial activity frames, such that given a certain total bit rate, better overall perceptual coding quality can be achieved. All these various quality preference practices may affect the α parameter of an encoder. In practice, different encoders may have different values of α, due to the fact that they may either involve different quality preference practices or implement them in different ways. Therefore, one needs to find out good heuristic values of α from extensive tests for each particular encoder under concern. In the case of our TIGER 3D VBR MVC video encoder, a good estimate of α for the base and joint view is about 1.2. For dependent views, the number could be smaller, as there is no I-frame coding due to the widely used inter-view prediction in dependent view frame coding.

Iterative Bit Rate Configuration Adjustment

Finally, if any one of the validity checks fails, we need to go back (e.g. to function block 205) and re-adjust the related problematic parameters in the original bit rate configuration, such that it can successfully pass all the validity checks.

Then, we can move on to run encoding with the resultant bit rate configuration. If the encoder fails to fulfill encoding with the resultant bit rate configuration, or the coded video quality is not acceptable, we also need to go back to (e.g. to function block 205) and adjust the bit rate configuration properly to prevent either encoding failure or poor encoding performance.

A description will now be given of some of the many attendant advantages/features of the present invention, some of which have been mentioned above. For example, one advantage/feature is an apparatus having an encoder for encoding image data for at least one picture for at least two joint views of multi-view video content. The at least two joint views include a base view and at least one dependent view. A bit rate configuration for encoding the image data is determined to include an average bit rate and a maximum bit rate for the base view and the average bit rate and the maximum bit rate for the at least two joint views.

Another advantage/feature is the apparatus having the encoder as described above, wherein the average bit rate and the maximum bit rate for the base view and the average bit rate and the maximum bit rate for the at least two joint views are mandatory constraints on the bit rate configuration.

Yet another advantage/feature is the apparatus having the encoder as described above, wherein a determination of the average bit rate and the maximum bit rate for the at least two joint views involves determining the average bit rate and the maximum bit rate for the at least one dependent view from among the at least two joint views as follows:

$$R_{avg,dpd,i} = \frac{(R_{avg,joint} - R_{avg,base})}{TotalViews - 1}, \text{ and}$$

-continued $$R_{max,dpd,i} = R_{avg,dpd,i} + \frac{\lfloor(R_{max,joint} - R_{avg,joint}) - (R_{max,base} - R_{avg,base})\rfloor}{TotalViews - 1}$$

where $R_{avg,dpd,i}$ and $R_{max,dpd,i}$ respectively denote average and maximum bit rate constraints for the $i^{th}$ dependent view from among the at least one dependent view, $R_{avg,joint}$ and $R_{max,joint}$ respectively denote the average and maximum bit rate for joints views, $R_{avg,base}$ and $R_{max,base}$ respectively denote the average and maximum bit rates for the base view, and TotalViews denotes a total number of the joint views.

Still another advantage/feature is the apparatus having the encoder wherein a determination of the average bit rate and the maximum bit rate for the at least two joint views involves determining the average bit rate and the maximum bit rate for the at least one dependent view from among the at least two joint views as follows:

$$R_{avg,dpd,i} = \frac{(R_{avg,joint} - R_{avg,base})}{TotalViews - 1}, \text{ and}$$

$$R_{max,dpd,i} = R_{avg,dpd,i} + \frac{\lfloor(R_{max,joint} - R_{avg,joint}) - (R_{max,base} - R_{avg,base})\rfloor}{TotalViews - 1}$$

as described above, wherein $R_{avg,dpd,i}$ and $R_{max,dpd,i}$ are non-mandatory parameters usable by the encoder to improve a coding efficiency of encoding the image data.

Moreover, another advantage/feature is the apparatus having the encoder wherein a determination of the average bit rate and the maximum bit rate for the at least two joint views involves determining the average bit rate and the maximum bit rate for the at least one dependent view from among the at least two joint views as follows:

$$R_{avg,dpd,i} = \frac{(R_{avg,joint} - R_{avg,base})}{TotalViews - 1}, \text{ and}$$

$$R_{max,dpd,i} = R_{avg,dpd,i} + \frac{\lfloor(R_{max,joint} - R_{avg,joint}) - (R_{max,base} - R_{avg,base})\rfloor}{TotalViews - 1}$$

as described above, wherein the at least one picture corresponds to a video sequence to be encoded, and $R_{avg,joint}$ is calculated as follows when the image data is encoded using variable bit rate multi-view video coding:

$$R_{avg,joint} = \frac{TotalStorageSpaceInBits}{TotalVideoLengthInSeconds}$$

where TotalStorageSpaceInBits and TotalVideoLengthInSeconds respectively denote a total amount of storage space available for use by said video encoder as measured in bits and a total length of the video sequence to which the at least one picture corresponds as measured in seconds.

Further, another advantage/feature is the apparatus having the encoder wherein a determination of the average bit rate and the maximum bit rate for the at least two joint views involves determining the average bit rate and the maximum bit rate for the at least one dependent view from among the at least two joint views as follows:

$$R_{avg,dpd,i} = \frac{(R_{avg,joint} - R_{avg,base})}{TotalViews - 1}, \text{ and}$$

-continued $$R_{max,dpd,i} = R_{avg,dpd,i} + \frac{\lfloor(R_{max,joint} - R_{avg,joint}) - (R_{max,base} - R_{avg,base})\rfloor}{TotalViews - 1}$$

as described above, wherein $R_{avg,joint}$ and $R_{max,joint}$ are respectively calculated as follows when the image data is encoded using constant bit rate multi-view video coding:

$$R_{avg,joint} = TotalChannelBandwithForVideo$$

$$R_{max,joint} = R_{max,system} - \sum_i R_{max,stream,i}$$

where $R_{max,system}$ and $R_{max,stream,i}$ respectively denote a maximum bit rate of an overall system output in a system that includes the video encoder and a maximum bit rate of an $i^{th}$ data stream in the system.

Also, another advantage/feature is the apparatus having the encoder wherein a determination of the average bit rate and the maximum bit rate for the at least two joint views involves determining the average bit rate and the maximum bit rate for the at least one dependent view from among the at least two joint views as follows:

$$R_{avg,dpd,i} = \frac{(R_{avg,joint} - R_{avg,base})}{TotalViews - 1}, \text{ and}$$

$$R_{max,dpd,i} = R_{avg,dpd,i} + \frac{\lfloor(R_{max,joint} - R_{avg,joint}) - (R_{max,base} - R_{avg,base})\rfloor}{TotalViews - 1}$$

as described above, wherein at least one of $R_{avg,dpd,i}$ and $R_{max,dpd,i}$ is respectively calculated to include a weighting factor indicating a degree of importance of a particular view to which the weighting factor is applied.

Additionally, another advantage/feature is the apparatus having the encoder wherein a determination of the average bit rate and the maximum bit rate for the at least two joint views involves determining the average bit rate and the maximum bit rate for the at least one dependent view from among the at least two joint views as follows:

$$R_{avg,dpd,i} = \frac{(R_{avg,joint} - R_{avg,base})}{TotalViews - 1}, \text{ and}$$

$$R_{max,dpd,i} = R_{avg,dpd,i} + \frac{\lfloor(R_{max,joint} - R_{avg,joint}) - (R_{max,base} - R_{avg,base})\rfloor}{TotalViews - 1}$$

as described above, wherein $R_{avg,dpd,i}$ and $R_{max,dpd,i}$ are respectively calculating by said video encoder during the encoding of the image data.

Moreover, another advantage/feature is the apparatus having the encoder as described above, wherein the encoder performs a validity check on the bit rate configuration as follows:

$$(R_{max,joint} - R_{avg,joint}) \geq (R_{max,base} - R_{avg,base}), \text{ and}$$

$$R_{max,view,i} \geq \alpha_i \cdot R_{avg,view,i}$$

where $R_{avg,joint}$ and $R_{max,joint}$ respectively denote the average and maximum bit rate for joints views, $R_{avg,base}$ and $R_{max,base}$ respectively denote the average and maximum bit rates for the base view, $R_{avg,view,i}$ and $R_{max,view,i}$ respectively denote the average and maximum bit rates for a particular view, the particular view being any of the joint views, the base view, and a single particular one of the at least one dependent view, and $\alpha_i$ denotes a minimum gap or minimum difference between the maximum bit rate and the average bit rate for the particular view.

Further, another advantage/feature is the apparatus having the encoder wherein the encoder performs a validity check on the bit rate configuration as follows:

$$(R_{max,joint} - R_{avg,joint}) \geq (R_{max,base} - R_{avg,base}), \text{ and}$$

$$R_{max,view,i} \geq \alpha_i \cdot R_{avg,view,i}$$

as described above, wherein a minimum limit imposed on the maximum bit rate for the joint views is modeled as the average bit rate of the joint views multiplied by an encoder specific multiplication factor.

Also, another advantage/feature is the apparatus having the encoder as described above, wherein the multi-view video content comprises three-dimensional video content.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

What is claimed is:

1. An apparatus, comprising:
an encoder for encoding image data for at least one picture for at least two joint views of multi-view video content, the at least two joint views including a base view and at least one dependent view, wherein a bit rate configuration for encoding the image data is determined to include an average bit rate and a maximum bit rate for the base view and the average bit rate and the maximum bit rate for the at least two joint views,
wherein a determination of the average bit rate and the maximum bit rate for the at least two joint views involves determining the average bit rate and the maximum bit rate for the at least one dependent view from among the at least two joint views as follows:

$$R_{avg,dpd,i} = \frac{(R_{avg,joint} - R_{avg,base})}{TotalViews - 1}, \text{ and}$$

$$R_{max,dpd,i} = R_{avg,dpd,i} + \frac{\lfloor (R_{max,joint} - R_{avg,joint}) - (R_{max,base} - R_{avg,base}) \rfloor}{TotalViews - 1}$$

wherein $R_{avg,dpd,i}$ and $R_{max,dpd,i}$ respectively denote average and maximum bit rate constraints for the $i^{th}$ dependent view from among the at least one dependent view, $R_{avg,joint}$ and $R_{max,joint}$ respectively denote the average and maximum bit rate for joint views, $R_{avg,base}$ and $R_{max,base}$ respectively denote the average and maximum bit rates for the base view, and TotalViews denotes a total number of the joint views.

2. The apparatus of claim 1, wherein the average bit rate and the maximum bit rate for the base view and the average bit rate and the maximum bit rate for the at least two joint views are mandatory constraints on the bit rate configuration.

3. The apparatus of claim 1, wherein $R_{avg,dpd,i}$ and $R_{max,dpd,i}$ are non-mandatory parameters usable by the encoder to improve a coding efficiency of encoding the image data.

4. The apparatus of claim 1, wherein the at least one picture corresponds to a video sequence to be encoded, and $R_{avg,joint}$ is calculated as follows when the image data is encoded using variable bit rate multi-view video coding:

$$R_{avg,joint} = \frac{TotalStorageSpaceInBits}{TotalVideoLengthInSeconds}$$

wherein TotalStorageSpaceInBits and TotalVideoLengthInSeconds respectively denote a total amount of storage space available for use by said video encoder as measured in bits and a total length of the video sequence to which the at least one picture corresponds as measured in seconds.

5. The apparatus of claim 1, wherein $R_{avg,joint}$ and $R_{max,joint}$ are respectively calculated as follows when the image data is encoded using constant bit rate multi-view video coding:

$$R_{avg,joint} = TotalChannelBandwithForVideo$$

$$R_{max,joint} = R_{max,system} - \sum_i R_{max,stream,i}$$

wherein $R_{max,system}$ and $R_{max,stream,i}$ respectively denote a maximum bit rate of an overall system output in a system that includes the video encoder and a maximum bit rate of an $i^{th}$ data stream in the system.

6. The apparatus of claim 1, wherein at least one of $R_{avg,dpd,i}$ and $R_{max,dpd,i}$ is respectively calculated to include a weighting factor indicating a degree of importance of a particular view to which the weighting factor is applied.

7. The apparatus of claim 1, wherein $R_{avg,dpd,i}$ and $R_{max,dpd,i}$ are respectively calculating by said video encoder during the encoding of the image data.

8. The apparatus of claim 1, wherein said encoder performs a validity check on the bit rate configuration as follows:

$$(R_{max,joint} - R_{avg,joint}) \geq (R_{max,base} - R_{avg,base}), \text{ and}$$

$$R_{max,view,j} \geq \alpha_i \cdot R_{avg,view,i}$$

wherein $R_{avg,view,i}$ and $R_{max,view,i}$ respectively denote the average and maximum bit rates for a particular view, the particular view being any of the joint views, the base view, and a single particular one of the at least one dependent view, and $\alpha_i$ denotes a minimum gap or minimum difference between the maximum bit rate and the average bit rate for the particular view.

9. The apparatus of claim 8, wherein a minimum limit imposed on the maximum bit rate for the joint views is modeled as the average bit rate of the joint views multiplied by an encoder specific multiplication factor.

10. The apparatus of claim 1, wherein the multi-view video content comprises three-dimensional video content.

11. In a video encoder, a method, comprising:
encoding image data for at least one picture for at least two joint views of multi-view video content, the at least two joint views including a base view and at least one dependent view, wherein a bit rate configuration for encoding the image data is determined to include an average bit rate and a maximum bit rate for the base view and the average bit rate and the maximum bit rate for the at least two joint views,
wherein a determination of the average bit rate and the maximum bit rate for the at least two joint views involves determining the average bit rate and the maximum bit rate for the at least one dependent view from among the at least two joint views as follows:

$$R_{avg,dpd,i} = \frac{(R_{avg,joint} - R_{avg,base})}{TotalViews - 1}, \text{ and}$$

$$R_{max,dpd,i} = R_{avg,dpd,i} + \frac{\lfloor (R_{max,joint} - R_{avg,joint}) - (R_{max,base} - R_{avg,base}) \rfloor}{TotalViews - 1}$$

wherein $R_{avg,dpd,i}$ and $R_{max,dpd,i}$ respectively denote average and maximum bit rate constraints for the $i^{th}$ dependent view from among the at least one dependent view, $R_{avg,joint}$ and $R_{max,joint}$ respectively denote the average and maximum bit rate for joint views, $R_{avg,base}$ and $R_{max,base}$ respectively denote the average and maximum bit rates for the base view, and TotalViews denotes a total number of the joint views.

12. The method of claim 11, wherein the average bit rate and the maximum bit rate for the base view and the average bit rate and the maximum bit rate for the at least two joint views are mandatory constraints on the bit rate configuration.

13. The method of claim 11, wherein $R_{avg,dpd,i}$ and $R_{max,dpd,i}$ are non-mandatory parameters usable by the encoder to improve a coding efficiency of encoding the image data.

14. The method of claim 11, wherein the at least one picture corresponds to a video sequence to be encoded, and $R_{avg,joint}$ is calculated as follows when the image data is encoded using variable bit rate multi-view video coding:

$$R_{avg,joint} = \frac{TotalStorageSpaceInBits}{TotalVideoLengthInSeconds}$$

wherein TotalStorageSpaceInBits and TotalVideoLengthInSeconds respectively denote a total amount of storage space available for use by said video encoder as measured in bits and a total length of the video sequence to which the at least one picture corresponds as measured in seconds.

15. The method of claim 11, wherein $R_{avg,joint}$ and $R_{max,joint}$ are respectively calculated as follows when the image data is encoded using constant bit rate multi-view video coding:

$$R_{avg,joint} = TotalChannelBandwithForVideo$$

$$R_{max,joint} = R_{max,system} - \sum_i R_{max,stream,i}$$

wherein $R_{max,system}$ and $R_{max,stream,i}$ respectively denote a maximum bit rate of an overall system output in a system that includes the video encoder and a maximum bit rate of an $i^{th}$ data stream in the system.

16. The method of claim 11, wherein at least one of $R_{avg,dpd,i}$ and $R_{max,dpd,i}$ is respectively calculated to include a weighting factor indicating a degree of importance of a particular view to which the weighting factor is applied.

17. The method of claim 11, wherein said encoder performs a validity check on the bit rate configuration as follows:

$$(R_{max,joint} - R_{avg,joint}) \geq (R_{max,base} - R_{avg,base}), \text{ and}$$

$$R_{max,view,j} \geq \alpha_i \cdot R_{avg,view,i}$$

wherein $R_{avg,view,i}$ and $R_{max,view,i}$ respectively denote the average and maximum bit rates for a particular view, the particular view being any of the joint views, the base view, and a single particular one of the at least one dependent view, and $\alpha_i$ denotes a minimum gap or minimum difference between the maximum bit rate and the average bit rate for the particular view.

18. The method of claim 11, wherein the multi-view video content comprises three-dimensional video content.

* * * * *